US011982176B2

(12) United States Patent
Affleck et al.

(10) Patent No.: US 11,982,176 B2
(45) Date of Patent: May 14, 2024

(54) SYSTEMS AND METHODS FOR MONITORING ANNULAR FLUID LEVEL

(71) Applicant: SAUDI ARABIAN OIL COMPANY, Dhahran (SA)

(72) Inventors: Michael Anthony Affleck, Aberdeen (GB); Krzysztof Karol Machocki, Aberdeen (GB); Chinthaka Pasan Gooneratne, Dhahran (SA); Timothy Eric Moellendick, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 155 days.

(21) Appl. No.: 17/649,026

(22) Filed: Jan. 26, 2022

(65) Prior Publication Data

US 2023/0235661 A1 Jul. 27, 2023

(51) Int. Cl.
*E21B 47/047* (2012.01)
*E21B 21/08* (2006.01)
*E21B 47/12* (2012.01)
*G01F 23/30* (2006.01)
*G01F 23/60* (2006.01)

(52) U.S. Cl.
CPC ............ *E21B 47/047* (2020.05); *E21B 21/08* (2013.01); *E21B 47/12* (2013.01); *G01F 23/30* (2013.01); *G01F 23/606* (2013.01)

(58) Field of Classification Search
CPC ........ E21B 21/08; E21B 47/047; E21B 47/12; G01F 23/30
See application file for complete search history.

(56) References Cited

U.S. PATENT DOCUMENTS 3,268,017 A * 8/1966 Yarbrough ............. E21B 21/08
                                                    175/215
11,629,990 B2 * 4/2023 Machocki ............. E21B 47/12
                                                    73/319
2002/0096323 A1 * 7/2002 Burris ................. G01F 23/2962
                                                    166/250.03

(Continued)

FOREIGN PATENT DOCUMENTS

CN  202012345 U    10/2011
CN  105275454 A *  1/2016
(Continued)

*Primary Examiner* — Jennifer H Gay
(74) *Attorney, Agent, or Firm* — Osha Bergman Watanabe & Burton LLP

(57) ABSTRACT

A system for monitoring an annular fluid level may include a floating element disposed on a surface of a drilling fluid within an annulus of the well, during mud cap drilling operations. The system may also include an antenna disposed above the floating element. The antenna may be configured to transmit a first signal to the floating element, and to receive a second signal from the floating element in response to the first signal. The system may also include a processor configured to determine a time value that measures a time between a transmittal, by the antenna, of the first signal and a receipt, by the antenna, of the second signal. The processor may also determine a state of a drilling fluid level within the annulus based on the time value, and update a drilling program for the well based on the state of the drilling fluid level.

19 Claims, 9 Drawing Sheets

(56) References Cited

U.S. PATENT DOCUMENTS

| | | | | |
|---|---|---|---|---|
| 2013/0120093 A1* | 5/2013 | Deville | ............... | H01F 38/14 |
| | | | | 336/115 |
| 2018/0119540 A1* | 5/2018 | Boscán Castillo | ..... | E21B 47/06 |
| 2021/0364336 A1* | 11/2021 | Machocki | ............... | E21B 47/12 |
| 2023/0235661 A1* | 7/2023 | Affleck | ............... | E21B 21/08 |
| | | | | 166/250.03 |

FOREIGN PATENT DOCUMENTS

| | | | | |
|---|---|---|---|---|
| CN | 106761689 A | * | 5/2017 | ......... E21B 47/047 |
| CN | 107152273 A | | 9/2017 | |
| CN | 209761416 U | | 12/2019 | |
| CN | 112682030 A | | 4/2021 | |
| FR | 2644242 A1 | * | 9/1990 | |

* cited by examiner

SYSTEMS AND METHODS FOR MONITORING ANNULAR FLUID LEVEL

BACKGROUND

In drilling operations, drilling fluids serve many functions: controlling formation pressures, removing cuttings from wellbore, sealing permeable formations encountered while drilling, cooling and lubricating the bit, transmitting hydraulic energy to downhole tools and the bit, and maintaining wellbore stability and well control.

Drilling fluid (also "mud") is vital for maintaining control of a well. The mud is pumped down the drill string of the well, through the bit. In open hole, hydrostatic pressure exerted by the mud column is used to offset increases in formation pressure that would otherwise force formation fluids into the borehole, possibly causing loss of well control.

Under normal operation conditions, the mud returns up the annulus, degraded by downhole conditions, dehydrated, and loaded with formation solids. At the surface, the mud flows down a flowline to a shale shaker where larger formation solids are removed from the mud. Further cleaning occurs as the fluid flows through the mud tank system.

However, if the pressure exerted by the drilling fluid exceeds the formation, pore, or fracture pressure of the rock, fluid from the mud may escape into the formation—a condition known as lost circulation (or loss). As a result of such losses, the drilling fluid level in the well annulus may drop below the level of entrance to the flowline.

As the drilling fluid level drops, the pressure acting on the formations at depth reduces. Such a condition can lead to fluid influx from one or more zones in the exposed section of the wellbore, thereby creating a well control event, including in the most extreme scenario a blow-out of hydrocarbons from the wellbore.

Accordingly, there is a need for a system that dynamically determines the annular fluid level in the annulus of the well and facilitates remedial actions to re-gain control of the well resulting from a change in the level of the annular fluid.

SUMMARY

This summary is provided to introduce concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system for monitoring the annular fluid level in a well. The system includes a floating element disposed on a surface of a drilling fluid within an annulus of a well, during mud cap drilling operations. The system includes an antenna disposed above the floating element. The antenna is configured to transmit a first signal to the floating element, and to receive a second signal from the floating element in response to the first signal. The system includes a processor configured to determine a time value that measures a time between a transmittal, by the antenna, of the first signal and a receipt, by the antenna, of the second signal, to determine a state of a drilling fluid level within the annulus based on the time value, and to update a drilling program for the well based on the state of the drilling fluid level.

In general, in one aspect, embodiments disclosed herein relate to a method for monitoring the annular fluid level in a well. The method includes determining a time value that measures a time between a transmittal, by an antenna disposed above a floating element within an annulus of a well, of a first signal and a receipt, by the antenna, of a second signal from the floating element disposed on a surface of a drilling fluid within the annulus. The method includes determining a state of a drilling fluid level within the annulus based on the time value. The method includes updating a drilling program for the well based on the state of the drilling fluid level.

Other aspects and advantages of the claimed subject matter will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
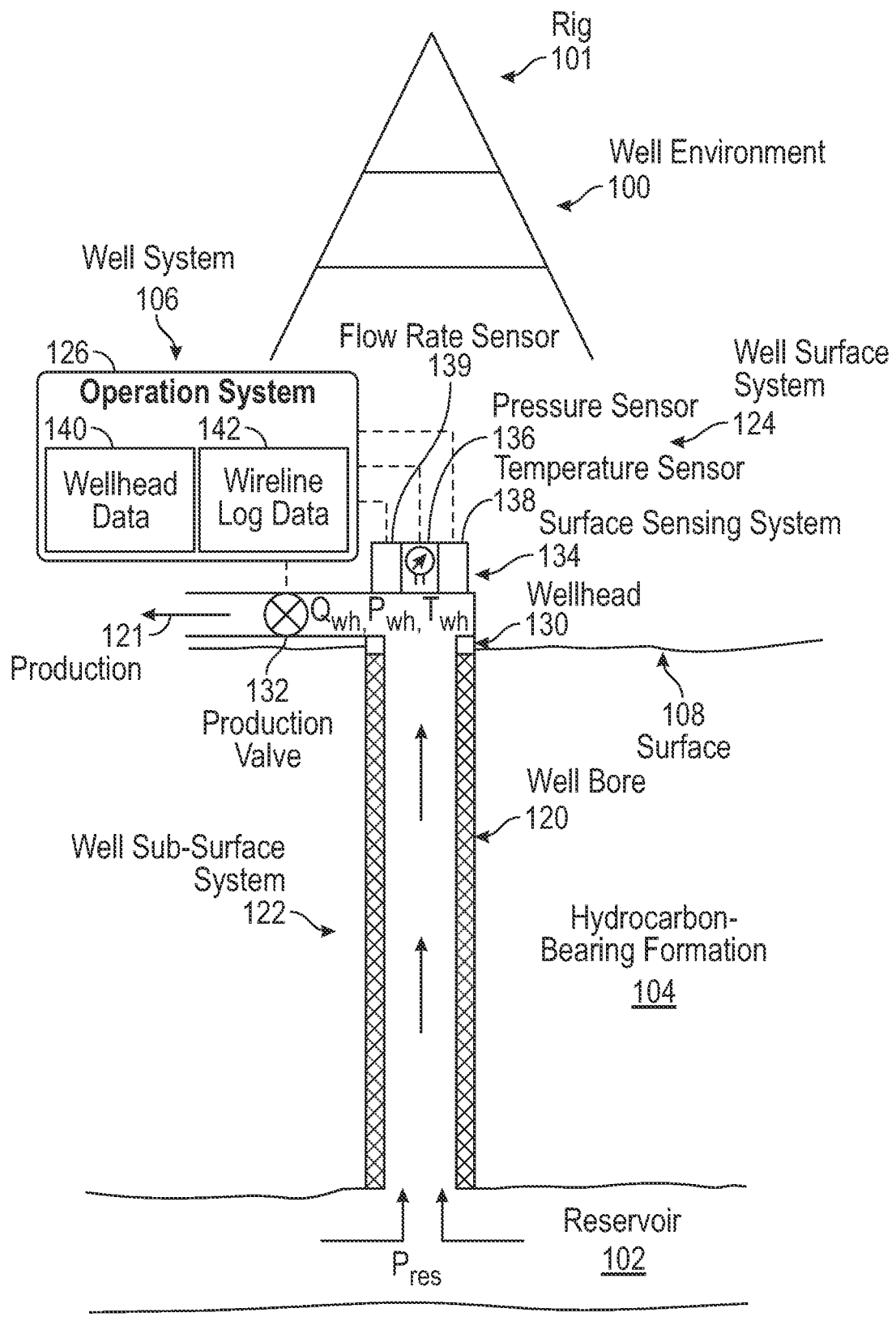
FIG. 1 illustrates a system, according to one or more example embodiments.

Example systems and methods for monitoring a fluid level in the annulus of a well are described. Unless explicitly stated otherwise, components and functions are optional and may be combined or subdivided. Similarly, operations may be combined or subdivided, and their sequence may vary.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, or third) may be used as an adjective for an element (that is, any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

When performing mud cap drilling activities, a system that measures mud loss in a well may determine that the amount of loss exceeds a loss threshold value and may notify a rig crew based on this determination. The rig crew may install a monitoring system for monitoring the annular fluid in the annulus of the well. The monitoring system may include a floating element, an antenna, and a processor. The monitoring system may dynamically determine the annular fluid level in the annulus of the well and facilitate remedial actions to re-gain control of the well resulting from a change in the level of the annular fluid.

The floating element may be of a solid type or a liquid type. By virtue of its physical characteristics, the floating element floats on the surface of the drilling fluid and travels upward or downward as the drilling fluid moves within the annulus of the well. In some example embodiments, if the floating element is solid, it is installed onto (or around) the drill string such that it floats vertically as the drilling fluid moves upward or downward in the annulus. In some instances, a floating element in the shape of a collar may include a hinge mechanism to allow the installation onto the drill string without breaking the drill string. In other instances, the collar-type floating element has a fixed (e.g., non-hinged) design that is installed during a break in the drill string such as when a connection is made on the rig floor.

In certain example embodiments, the floating element, whether solid or liquid, is positioned in the annulus space, on the surface of the drilling fluid. In various example embodiments, if the floating element is liquid, it is poured into the annulus. The liquid floating element, under its gravity, descends to the mud-gas contact point. The floating element may be made of, for example, Cork, Balsa, Polyurethane Foam, Ethylene Vinyl Acetate Foam, Rohacell, or polymethacrylimide (PMI) foam.

The antenna is disposed (e.g., placed or installed) above the floating element and is configured to transmit and receive signals to and from the floating element. According to some example embodiments, the antenna is installed onto the rig structure or rotary table assembly underside, in proximity to (e.g., within a pre-determined distance from) the well center axis to provide an approximate line-of-sight or near line of sight into the well. Once the floating element is placed below the antenna level, the monitoring system may determine the drilling fluid level in the annulus of the well.

For example, the antenna transmits a first signal to the floating element. The floating element receives the first signal and transmits a second signal to the antenna. In some instances, the second signal includes the first signal reflected, by the floating element, back to the antenna. The antenna receives the second signal from the floating element in response to the first signal. The antenna may also record the time of the transmittal, by the antenna, of the first signal and the time of the receipt, by the antenna, of the second signal. The antenna may communicate (e.g., transmit) the time of the transmittal, by the antenna, of the first signal and the time of the receipt, by the antenna, of the second signal to a hardware processor (hereinafter also "processor"). In some instances, the processor may be external to the antenna, for example, included in a control system located remotely from the antenna. In other instances, the processor is included in an antenna assembly (or system).

The processor determines a time value that measures a time between the time of transmittal, by the antenna, of the first signal and the time of receipt, by the antenna, of the second signal. In addition, the processor determines a state of a drilling fluid level within the annulus based on the time value. In some example embodiments, determining the state of the drilling fluid level includes determining that the drilling fluid level has dropped as compared to a previously determined drilling fluid level. Further, the processor may update a drilling program for the well based on the state of the drilling fluid level. In some example embodiments, the updating of the drilling program includes generating an instruction to stop the drilling operations. In various example embodiments, the updating of the drilling program includes generating and transmitting a communication to a client device, pertaining to the state of the drilling fluid level. In some instances, the communication to the client device may include an instruction to sound an audible or visual alarm based on an annular fluid level drop below a depth threshold value or based on a rate of depth change over a period of time exceeding a rate of depth threshold value. The communication may also include data pertaining to the presence of a gas or to other drilling fluid properties detected at the floating element (e.g., a measurement of the fluid density, temperature, percentage of water, or percentage of oil), that may indicate a hazardous condition or a potentially hazardous condition associated with the well.

In some example embodiments, should the floating element signal or feedback be inadequate or otherwise fail to be received by the antenna, another floating element can be installed or be allowed to fall directly onto, or next to, the existing floating element. The floating element signal may be inadequate if it is not received by the antenna at all, is too weak to be amplified and read, or is distorted by environmental conditions such as drill string movement or rig noise.

In some example embodiments, a solid floating element emits a wireless signal whose properties change as the floating element travels on the surface of the rising or falling mud in the annulus of the well, such that the antenna and the processor can interpret the signal and determine the level of the mud within the annulus. Properties that may change include the signal strength or attenuation, particularly if the floating element first receives a signal from surface and resends the signal to surface (with or without additional data). Other signal properties may change as the length of the casing above the floating element changes.

In certain example embodiments, the solid floating element measures then wirelessly transmits vertical position data of the solid floating element or data that can be interpreted into vertical position to the antenna. For example, the solid floating element may include a barometric altimeter instrument to determine the vertical position of the solid floating element.

In various example embodiments, the solid floating element includes one or more sensors to detect (or capture) drilling parameter data such as a gas (or gas concentration). The floating element is configured to transmit the captured sensor data to the antenna. The captured sensor data may be analyzed by the processor to determine whether the captured sensor data indicates a potentially hazardous condition associated with the drilling fluid.

According to some example embodiments, the floating element is a passive device floating on the surface of the drilling fluid, that receives signals from the antenna and reflects the signals back to the antenna. Such a floating element may be characterized by properties, such as a reflective coating, that reflect (or amplify) a received signal back to the antenna. In some instances, a portion, such as an upper (top or looking-up) surface, of the floating element is coated with a reflective coating to facilitate communication or position information transmittal to the antenna.

In various example embodiments, the solid floating element is an actively-instrumented (e.g., powered) solid float. In some instances, the actively-instrumented floating elements is powered by battery. In other instances, the actively-instrumented floating elements is not powered by battery, but utilizes energy harvested by the floating element through float movement. For example, the solid floating element can harvest energy from the vibration of the drill string, based on drilling fluids hydraulics, or any other form of energy that makes the solid float vibrate or move. Energy harvesting technologies include but are not limited to piezoelectric, triboelectric, magnetostrictive, or thermoelectric. As such, the solid float can be a self-powered, battery-less device that remains inside the wellbore over an indefinite time period.

The system for monitoring a fluid level in the annulus of a well provides a number of benefits when compared to conventional systems used for preventing well control events. Conventional mud cap drilling without annular level measurement can be called "drilling blind." The conventional Pressurized mud-cap drilling (PCMD) systems require additional equipment and personnel to monitor and control the annular pressure at the surface. An example of the additional equipment is a rotating control device (RCD) and pipe (or valve) to route pressurized flow to and from the well annulus. In contrast, the systems described in the present disclosure facilitate drilling through a highly fractured formation without a PCMD system package and efficient monitoring for potentially hazardous conditions associated with the drilling fluid.

FIG. 1 shows a schematic diagram of a system, in accordance with one or more embodiments. FIG. 1 illustrates a well environment 100 that includes a hydrocarbon reservoir ("reservoir") 102 located in a subsurface hydrocarbon-bearing formation ("formation") 104 and a well system 106. The hydrocarbon-bearing formation 104 may include a porous or fractured rock formation that resides underground, beneath the earth's surface ("surface") 108. In the case of the well system 106 being a hydrocarbon well, the reservoir 102 may include a portion of the hydrocarbon-bearing formation 104. The hydrocarbon-bearing formation 104 and the reservoir 102 may include different layers of rock having varying characteristics, such as varying degrees of permeability, porosity, capillary pressure, and resistivity. In the case of the well system 106 being operated as a production well, the well system 106 may facilitate the extraction (or "production") of hydrocarbons from the reservoir 102.

In some embodiments disclosed herein, the well system 106 includes a rig 101, a wellbore 120, a well sub-surface system 122, a well surface system 124, and an operation system 126. The operation system 126 may control various operations of the well system 106, such as well production operations, well completion operations, well maintenance operations, and reservoir monitoring, assessment, and development operations. In some embodiments, the operation system 126 includes a computer system that is the same as or similar to computing system 1100 described below in FIG. 11, and the accompanying description.

The rig 101 is the machine used to drill a borehole to form the wellbore 120. Major components of the rig 101 include the mud tanks, the mud pumps, the derrick or mast, the drawworks, the rotary table or topdrive, the drillstring, the power generation equipment, and auxiliary equipment.

The wellbore 120 includes a bored hole (i.e., borehole) that extends from the surface 108 into a target zone of the hydrocarbon-bearing formation 104, such as the reservoir 102. An upper end of the wellbore 120, terminating at or near the surface 108, may be referred to as the "up-hole" end of the wellbore 120, and a lower end of the wellbore, terminating in the hydrocarbon-bearing formation 104, may be referred to as the "downhole" end of the wellbore 120. The wellbore 120 may facilitate the circulation of drilling fluids during drilling operations, the flow of hydrocarbon production ("production") 121 (e.g., oil, gas, or both) from the reservoir 102 to the surface 108 during production operations, the injection of substances (e.g., water) into the hydrocarbon-bearing formation 104 or the reservoir 102 during injection operations, or the communication of monitoring devices (e.g., logging tools) into the hydrocarbon-bearing formation 104 or the reservoir 102 during monitoring operations (e.g., during in situ logging operations).

In some embodiments, during operation of the well system 106, the operation system 126 collects and records wellhead data 140 for the well system 106. The wellhead data 140 may include, for example, a record of measurements of wellhead pressure values ($P_{wh}$) (e.g., including flowing wellhead pressure values), wellhead temperature values ($T_{wh}$) (e.g., including flowing wellhead temperature values), wellhead multiphase production rates ($Q_{wh}$) over some or all of the life of the well system 106, and water cut data. In some embodiments, the measurement values are recorded in real-time, and are available for review or use within seconds, minutes, or hours of the condition being sensed (e.g., the measurements are available within one hour of the condition being sensed). In such an embodiment, the wellhead data 140 may be referred to as "real-time" wellhead data 140. Real-time wellhead data 140 may enable an operator of the well system 106 to assess a relatively current state of the well system 106, and make real-time decisions regarding development or management of the well system 106 and the reservoir 102, such as on-demand adjustments in regulation of production flow from the well. In some instances, the real-time decisions are performed automatically.

According to some example embodiments, the operation system 126 collects and records wireline log data 142 for the well system 106. The collecting of the wireline log data 142 may include continuous measurement of formation properties with electrically powered instruments to determine the properties of formation rock. The collected measurements may include electrical properties (e.g., resistivity and conductivity at various frequencies), sonic properties, active and passive nuclear measurements, dimensional measurements of the wellbore, formation fluid sampling, and formation pressure measurement. In some instances, to collect the wireline measurements, a logging tool is lowered into the open wellbore on a multiple conductor, contra-helically armored wireline cable. Once a tool string of the logging tool has reached the bottom of the interval of interest, measurements are taken on the way out of the wellbore. In certain example embodiments, the wireline logging tools include one or more sensors inserted in the wellbore 120 via a cable to measure certain rock properties at different depth points (e.g., every half a foot).

In some embodiments, the well sub-surface system 122 includes casing installed in the wellbore 120. For example, the wellbore 120 may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore 120 to define a central passage that provides a conduit for the transport of tools and substances through the wellbore 120. For example, the central passage may provide a conduit for lowering logging tools into the wellbore 120, a conduit for the flow of production 121 (e.g., oil and gas) from the reservoir 102 to the surface 108, or a conduit for the flow of injection substances (e.g., water) from the surface 108 into the hydrocarbon-bearing formation 104. In some embodiments, the well sub-surface system 122 includes production tubing installed in the wellbore 120. The production tubing may provide a conduit for the transport of tools and substances through the wellbore 120. The production tubing may, for example, be disposed inside casing. In such an embodiment, the production tubing may provide a conduit for some or all of the production 121 (e.g., oil and gas) passing through the wellbore 120 and the casing. An annulus within the well sub-surface system 122 provides a conduit for the drilling fluid during various drilling operations.

In some example embodiments, a floating element is disposed on a surface of a drilling fluid within an annulus of a well, during drilling. The floating element may, in some instances, be a floating collar that is disposed around the drill string and that floats on the surface of the drilling fluid in the annulus. In other instances, the floating element is a "slick" or liquid floating element that floats on the surface of the drilling fluid in the annulus. In addition, an antenna is disposed above the floating element (e.g., below a rotary table of the well, or within the annulus of the well, etc.). The antenna is configured to periodically transmit a first signal to the floating element and to receive a second signal from the floating element in response to the first signal. A processor of a annular fluid monitoring system (e.g., operating system 126) is configured to determine a time value that measures a time between a transmittal, by the antenna, of the first signal and a receipt, by the antenna, of the second signal, to determine a state of a drilling fluid level within the annulus based on the time value, and to update a drilling program for the well based on the state of the drilling fluid level.

In some embodiments, the well surface system 124 includes a wellhead 130. The wellhead 130 may include a rigid structure installed at the up-hole end of the wellbore 120, at or near where the wellbore 120 terminates at the Earth's surface 108. The wellhead 130 may include structures for supporting (or "hanging") casing and production tubing extending into the wellbore 120. Production 121 may flow through the wellhead 130, after exiting the wellbore 120 and the well sub-surface system 122, including, for example, the casing and the production tubing. In some embodiments, the well surface system 124 includes flow regulating devices that are operable to control the flow of substances into and out of the wellbore 120. For example, the well surface system 124 may include one or more production valves 132 that are operable to control the flow of production 134. A production valve 132 may be fully opened to enable unrestricted flow of production 121 from the wellbore 120. Further, the production valve 132 may be partially opened to partially restrict (or "throttle") the flow of production 121 from the wellbore 120. In addition, the production valve 132 may be fully closed to fully restrict (or "block") the flow of production 121 from the wellbore 120, and through the well surface system 124.

In some embodiments, the wellhead 130 includes a choke assembly. For example, the choke assembly may include hardware with functionality for opening and closing the fluid flow through pipes in the well system 106. Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke is taken out of service, the flow can be directed through another choke. In some embodiments, pressure valves and chokes are communicatively coupled to the operation system 126. Accordingly, the operation system 126 may obtain wellhead data regarding the choke assembly as well as transmit one or more commands to components within the choke assembly in order to adjust one or more choke assembly parameters.

Keeping with FIG. 1, in some embodiments, the well surface system 124 includes a surface sensing system 134. The surface sensing system 134 may include sensors for sensing characteristics of substances, including production 121, passing through or otherwise located in the well surface system 124. The characteristics may include, for example, pressure, temperature and flow rate of production 121 flowing through the wellhead 130, or other conduits of the well surface system 124, after exiting the wellbore 120. The surface sensing system 134 may also include sensors for sensing characteristics of the rig 101, such as bit depth, hole depth, drilling mudflow, hook load, rotary speed, etc.

In some embodiments, the surface sensing system 134 includes a surface pressure sensor 136 operable to sense the pressure of production 121 flowing through the well surface system 124, after it exits the wellbore 120. The surface pressure sensor 136 may include, for example, a wellhead pressure sensor that senses a pressure of production 121 flowing through or otherwise located in the wellhead 130. In some embodiments, the surface sensing system 134 includes a surface temperature sensor 138 operable to sense the temperature of production 121 flowing through the well surface system 124, after it exits the wellbore 120. The surface temperature sensor 138 may include, for example, a wellhead temperature sensor that senses a temperature of production 121 flowing through or otherwise located in the wellhead 130, referred to as "wellhead temperature" ($T_{wh}$). In some embodiments, the surface sensing system 134 includes a flow rate sensor 139 operable to sense the flow rate of production 121 flowing through the well surface system 124, after it exits the wellbore 120. The flow rate sensor 139 may include hardware that senses a flow rate of production 121 ($Q_{wh}$) passing through the wellhead 130. In some embodiments, downhole sensors and gauges are operable to capture production-related data (e.g., pressures, temperatures, etc.).

While FIG. 1 illustrates a configuration of components, other configurations may be used without departing from the scope of the disclosure. For example, various components in FIG. 1 may be combined to create a single component. As another example, the functionality performed by a single component may be performed by two or more components.

Figure 2:
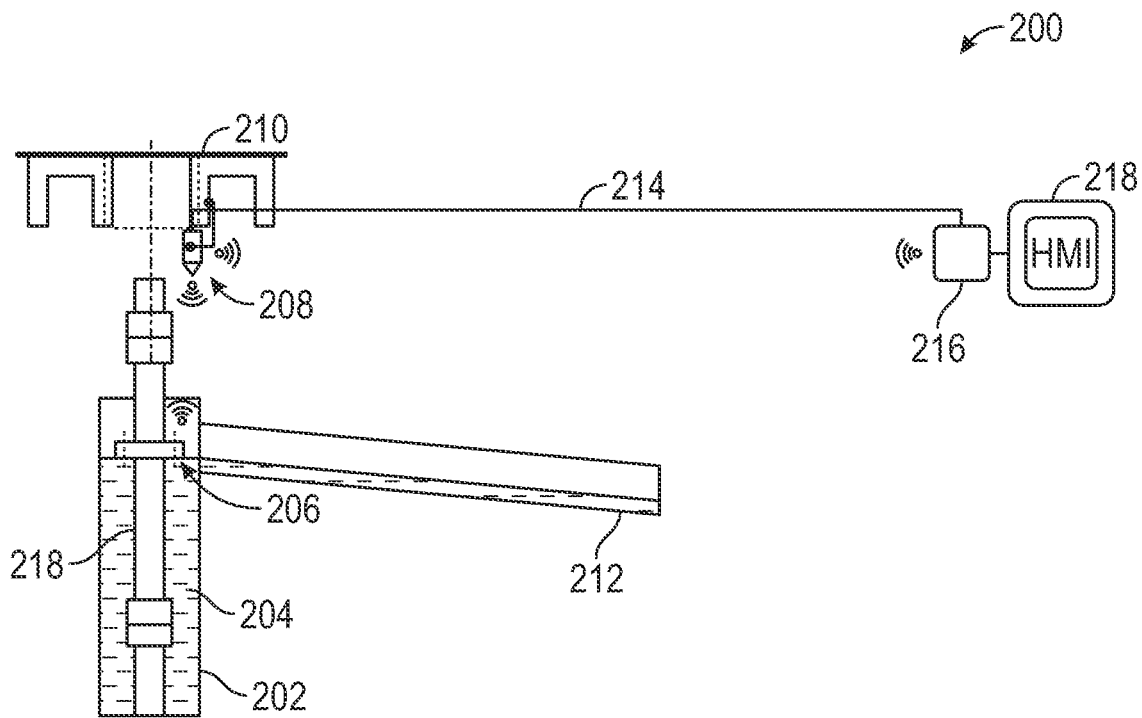
FIG. 2 is a diagram that illustrates a system for monitoring an annular fluid level in a well, according to one or more example embodiments.

FIG. 2 is a diagram that illustrates a system 200 for monitoring an annular fluid level in a well, according to one or more example embodiments. As shown in FIG. 2, the system 200 includes a floating element 206 disposed (e.g., floating) on a surface of a drilling fluid 204 within an annulus of a well 202, during mud cap drilling operations. In some example embodiments, the floating element 206 may be a solid float or liquid float that is buoyant in variable density fluids. The floating element 206 is also robust—although not attached to the drill string 218, the floating element 206 is resistant to vibration and mechanical forces associated with the movement of the drill string 218 during operations, including but not limited to drilling and tripping. Further, despite being partially or fully coated in drilling fluid and despite being exposed to significant turbulence at the annular liquid surface, the floating element 206 migrates to the surface of the drilling fluid.

The floating element 206 may be of various types. Some examples types of floating element are a solid collar floating element, a split collar- or hinge-type floating element, an open helix (spiral) floating element, a stick floating element, a bobbin (or ball) floating element, and a liquid (or slick) floating element. A collar assembly may be a solid ring design, a split ring with or without a hinge assembly, or a helix design. Regardless of type of floating element, the floating element 206 may be installed (placed or located) around or at the side of the drill string 218 such that the floating element 206 may float on the surface of the drilling fluid without being attached to the drill string 218. The internal diameter of the collar floating element is sized to ensure it easily runs across both pipe body sections and larger tool joints. The external diameter of the collar floating element is sized to minimize contact with the casing.

The solid float installation and removal may require the drill string 218 to be broken, and the use of a suitable running and retrieval tool. However, if the collar is of a helix, hinge, or split-segment type of design, there is no need to break the drill string 218 or to use the running and retrieval tool. When selecting the type and dimensions (if a solid float) for the floating element 206, tubular string eccentricity, bending, off-set, standoff, or other close tolerance between the running string outside diameter and the casing string inside diameter are some of the factors considered.

In some example embodiments, the floating element 206 includes a singular floating element. In other example embodiments, the floating element 206 includes multiple floating elements. For example, the floating element 206 is a singular collar. According to another example, the floating element 206 includes a plurality of bobbins.

In some example embodiments, the floating element 206 includes floating elements of different types or different sizes. For example, a single solid float (or multiple solid floats) may be deployed in addition to a liquid float.

In various example embodiments, the floating element 206 includes instrumentation (e.g., a sensor) to monitor the annulus for the presence of hydrocarbons, such as the hydrogen sulfide (H2S) gas. This is particularly relevant if the liquid level drops considerably, potentially indicating that a significant well control incident (e.g., a blow-out) is imminent.

Keeping with FIG. 2, under normal operations conditions, when the pressure exerted by the drilling fluid does not exceed the fracture pressure of the formation, the drilling fluid 204 returns up the annulus and flows down flowline 212 to a shale shaker where larger formation solids are removed from the drilling fluid. However, when the pressure exerted by the drilling fluid exceeds the fracture pressure of the formation, a portion of the drilling fluid 204 is absorbed into the crevices of the formation and does not return to the surface. This may result in the level of the drilling fluid 204 to drop and not reach the level of entry to the flowline 212.

As shown in FIG. 2, the system 200 also includes an antenna 208 that is disposed on a plane (or at a level) above the floating element 206 within the annulus of the well 202. In some example embodiments, the antenna 208 is installed below (e.g., affixed under or to the bottom of) the rotary table 210. The antenna 208 may be battery-powered or hard-wired to the power supply of the rig.

The antenna 208 is configured to periodically transmit a first signal to the floating element 206 and to receive a second signal from the floating element 206 in response to the first signal. In some example embodiments, the signal communications between the antenna 208 and the floating element 206 are performed wirelessly. The wireless signals may be acoustic, ultrasonic, light, radar, electromagnetic, microwave, optical, or any other wireless communication protocol.

In some example embodiments, the antenna 208 is installed as an element or sub (or subs) within the drill or tubular string. The tubular string antenna collects data from the floating element 206 and transmits the data to the control system 216 using wireless communication, such as "wired pipe," acoustic, or electromagnetic data communications systems. Once at the surface, the data parameters relevant to the annulus fluid level are presented to a drill crew via the control system 216.

The antenna 208 (or, in some instances, a control system 216) may use properties of the floating element 206 to determine the relative distance and change in distance between the antenna 208 and the floating element 206. Example properties include reflectance or signal re-transmissibility, with or without signal boosting or alteration.

In some example embodiments, the antenna 208 (e.g., a processor of the antenna 208) is configured to determine, based on the second signal, a time value that measures a time between a transmittal, by the antenna 208, of the first signal and a receipt, by the antenna 208, of the second signal. The antenna 208 may communicate (e.g., transmit wirelessly or by wire) the time value to a control system (e.g., a hardware processor) 216 or a data repository. In some example embodiments, the antenna 208 has a transmittal capability with configurable range of up to 10,000 meters. In certain example embodiments, the antenna 208 receives signals from the floating element 206 and relays the data to the control system 216.

The control system 216 is configured to access (e.g., receive or obtain) the time value from the antenna 208 (or from the data repository) and to determine a state of a drilling fluid level within the annulus of the well 202 based on the time value. In addition, the control system 216 may update a drilling program for the well 202 based on the determined state of the drilling fluid level. In some example embodiments, the updating of the drilling program includes generating an alert pertaining to the drilling fluid level. In various example embodiments, the updating of the drilling program includes generating instructions to cause a change to the drilling operations based on the state of the drilling fluid level. The control system (216) may be located in a hazardous area in the near rig location or some distance from the rig floor.

In some example embodiments, the updating of the drilling program includes displaying a notification in a human machine interface (HMI) 218. The HMI 218 may be a user interface or dashboard that facilitates an interaction by a person with a machine, system, or device. For example, the HMI 218 may be a graphical user interface of a client device.

Figure 3:
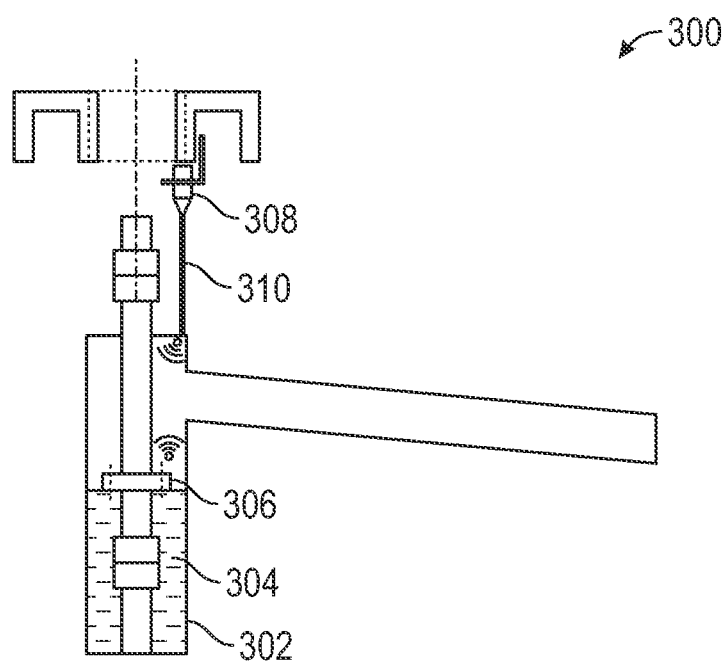
FIG. 3 is a diagram that illustrates a system for monitoring the annular fluid level in the well, according to one or more example embodiments.

FIG. 3 is a diagram that illustrates a system 300 for monitoring the annular fluid level in the well 302, according to one or more example embodiments. In some instances, the level of the drilling fluid 304 drops, thereby creating a greater distance between the floating element 306 floating on the surface of the drilling fluid 304 and the antenna 308. In a situation like this, the wireless communications between the antenna 308 and the floating element 306 may become unreliable. To improve the wireless communications between the floating element 306 and the antenna 308, the antenna 308 may include an extension tube 310, as shown in FIG. 3.

Figure 4:
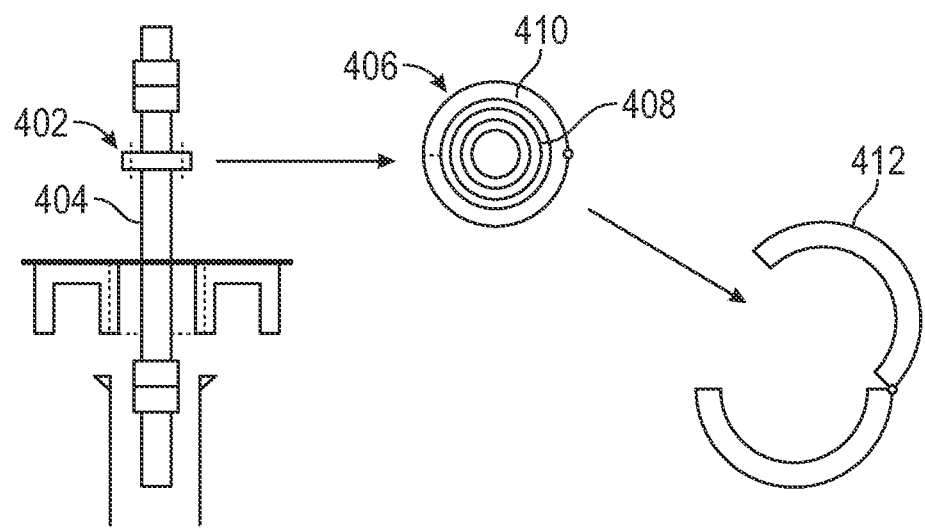
FIG. 4 is a diagram that illustrates a floating element installed around a drilling string of the well, according to one or more example embodiments.

FIG. 4 is a diagram that illustrates a floating element 402 installed around a drilling string 404 of the well, according to one or more example embodiments. Item 406 illustrates a top view of the floating element 402 as installed around the drill string 404. In the top view, the drill string 404 is referenced as item 408 and the floating element 402 is referenced as item 410.

The floating element 402 is of a split-collar type. As shown in FIG. 4, the floating element 402 comprises a hinge 412 that can be opened to be placed around the drill string 404.

Figure 5:
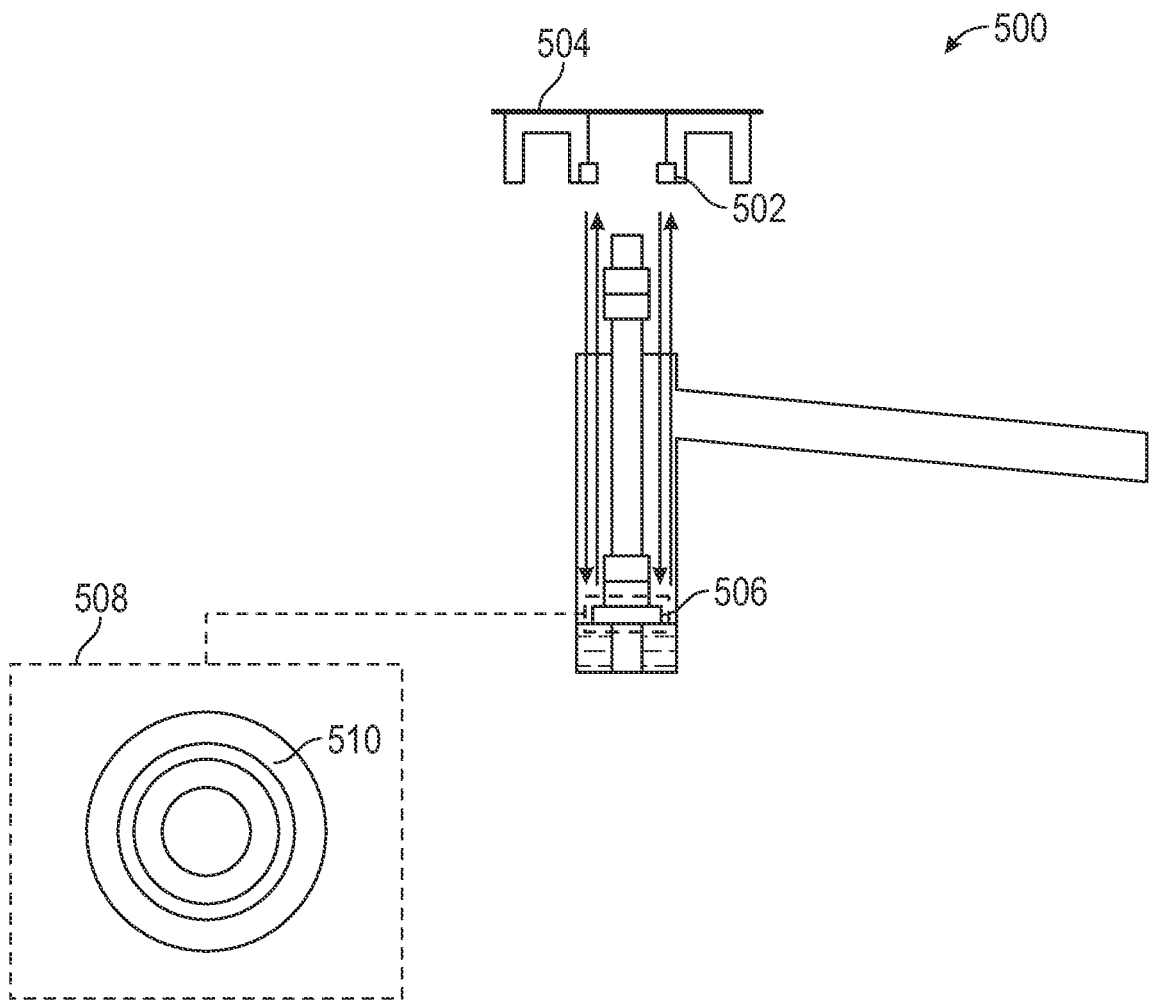
FIG. 5 is a diagram that illustrates a system for monitoring the annular fluid level in the well using an antenna disposed under the rotary table, according to one or more example embodiments.

FIG. 5 is a diagram that illustrates a system 500 for monitoring the annular fluid level in the well using a transceiver disposed under the rotary table, according to one or more example embodiments. In some example embodiments, the floating element 506 (shown as item 510 in the top view 508) includes an acoustic reflector, either single or multi-layered, to accurately reproduce a reference echo amplitude. The antenna 502 may be installed under the rotary table 504 and may include an acoustic transceiver that transmits an acoustic wave into the annulus of the well and receives a reference echo from the acoustic reflector of the floating element 506. The time taken for a transmitted acoustic wave to reflect back to the acoustic transceiver 502 may provide an indication of the drilling fluid level. The acoustic reflector 510 may be made of a material that provides a high level of reflection or may be coated in a specific pattern or design to reflect a unique signal back to the acoustic transceiver 502. Therefore, the transmitted acoustic waves can be controlled, directed, and manipulated to ensure accuracy of detection.

In various example embodiments, the floating element 506 includes an optical (or light) reflector, such as a Micro-Dyn coating, to accurately reproduce a reference light signal. The antenna 502 may be installed under the rotary table 504 and may include an optical transceiver that transmits the optical wave and receives the reflected optical wave from the optical reflector. The time taken for a transmitted optical wave to reflect back to the optical transceiver may provide an indication of the drilling fluid level. The optical reflector can be coated in a specific pattern or design to reflect a unique signal back to the optical transceiver. Therefore, the transmitted optical waves can be controlled, directed, and manipulated to ensure accuracy of detection.

Figure 6:
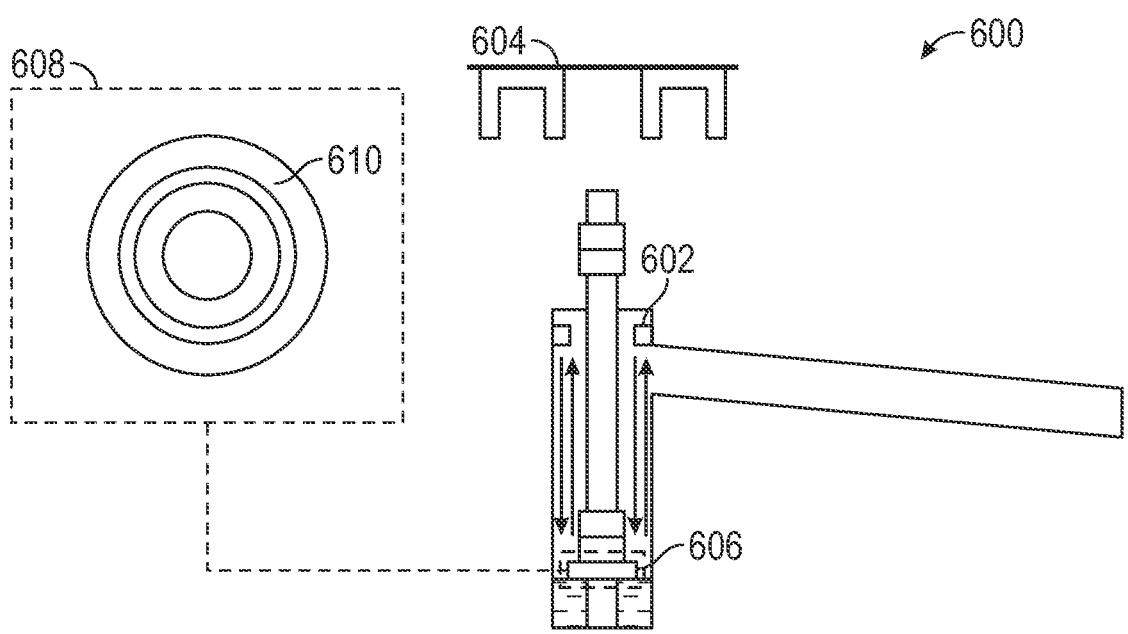
FIG. 6 is a diagram that illustrates a system for monitoring the annular fluid level in the well using an antenna disposed at the bell nipple, according to one or more example embodiments.

FIG. 6 is a diagram that illustrates a system 600 for monitoring the annular fluid level in the well using an antenna disposed at the bell nipple, according to one or more example embodiments. As shown in FIG. 6, the antenna 602 is disposed at the bell nipple of the well (and not under the rotary table 604). In some example embodiments, the antenna 602 includes an acoustic transceiver to transmit an acoustic wave into the annulus of the well and to receive a reference echo from an acoustic reflector included in the floating element 606 (shown as item 610 in the top view 608).

In certain example embodiments, the antenna 602 includes an optical transceiver to transmit an optical wave into the annulus of the well and to receive a reflected optical wave from an optical reflector included in the floating element 606.

Figure 7:
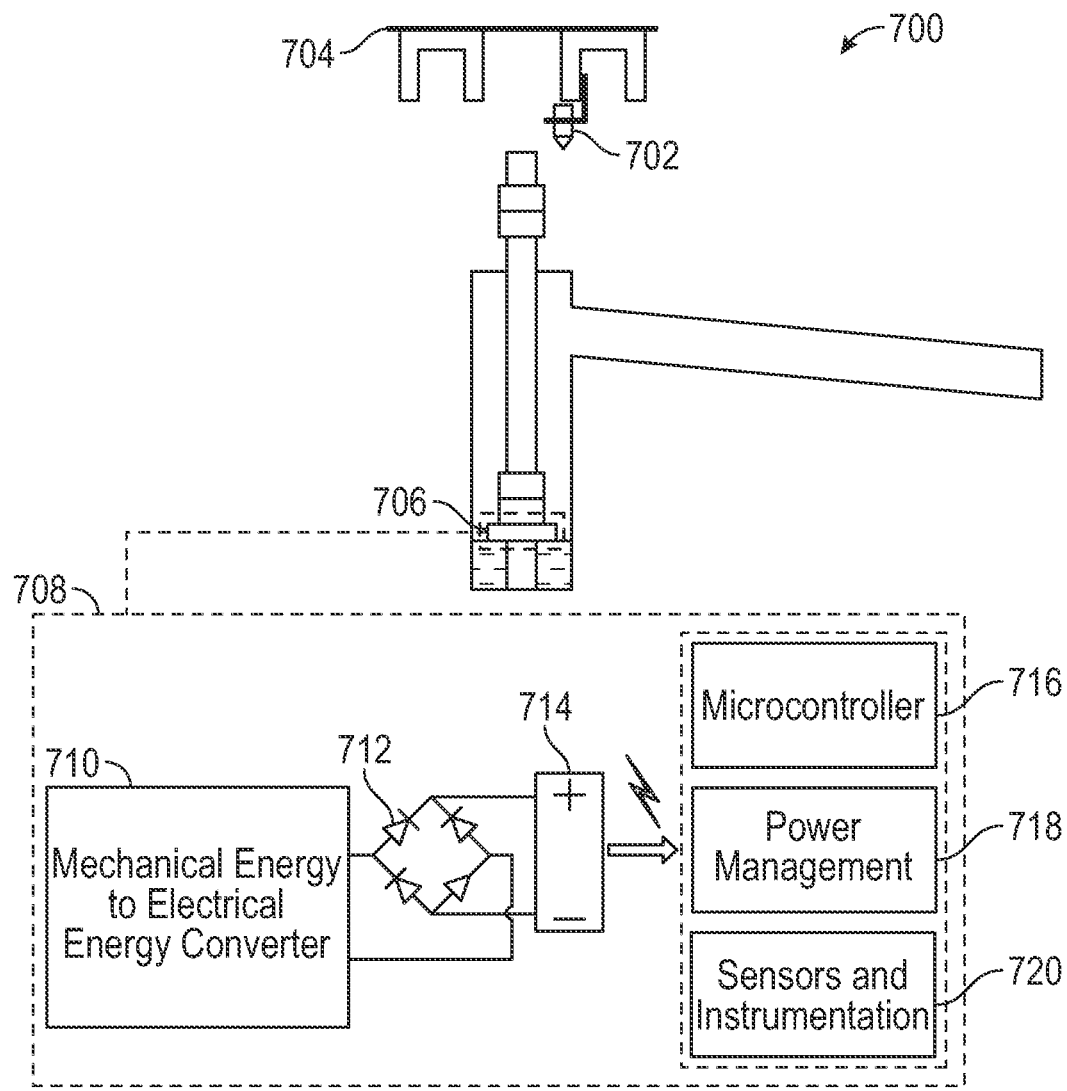
FIG. 7 is a diagram that illustrates a system for monitoring the annular fluid level in the well using a floating element that converts mechanical energy into electrical energy, according to one or more example embodiments.

FIG. 7 is a diagram that illustrates a system for monitoring the annular fluid level in the well using a floating element that converts mechanical energy into electrical energy, according to one or more example embodiments. The floating element 706 may wirelessly transmits data to the antenna 702 which may be located under the rotary table 704.

As illustrated in FIG. 7, the floating element 706 (also shown in the expanded view 708) includes a converter 710, a bridge rectifier circuit 712, a battery 714, a microcontroller 716, a power management unit 718, and one or more sensors 720. The converter 710 converts mechanical energy to electrical energy. The bridge rectifier circuit 712 converts alternating current (AC) received from the converter 710 to direct current (DC). The battery 714 receives the DC input from the bridge rectifier circuit 712, and feeds the DC input to the microcontroller 716, the power management unit 718, and the one or more sensors 720.

Figure 8:
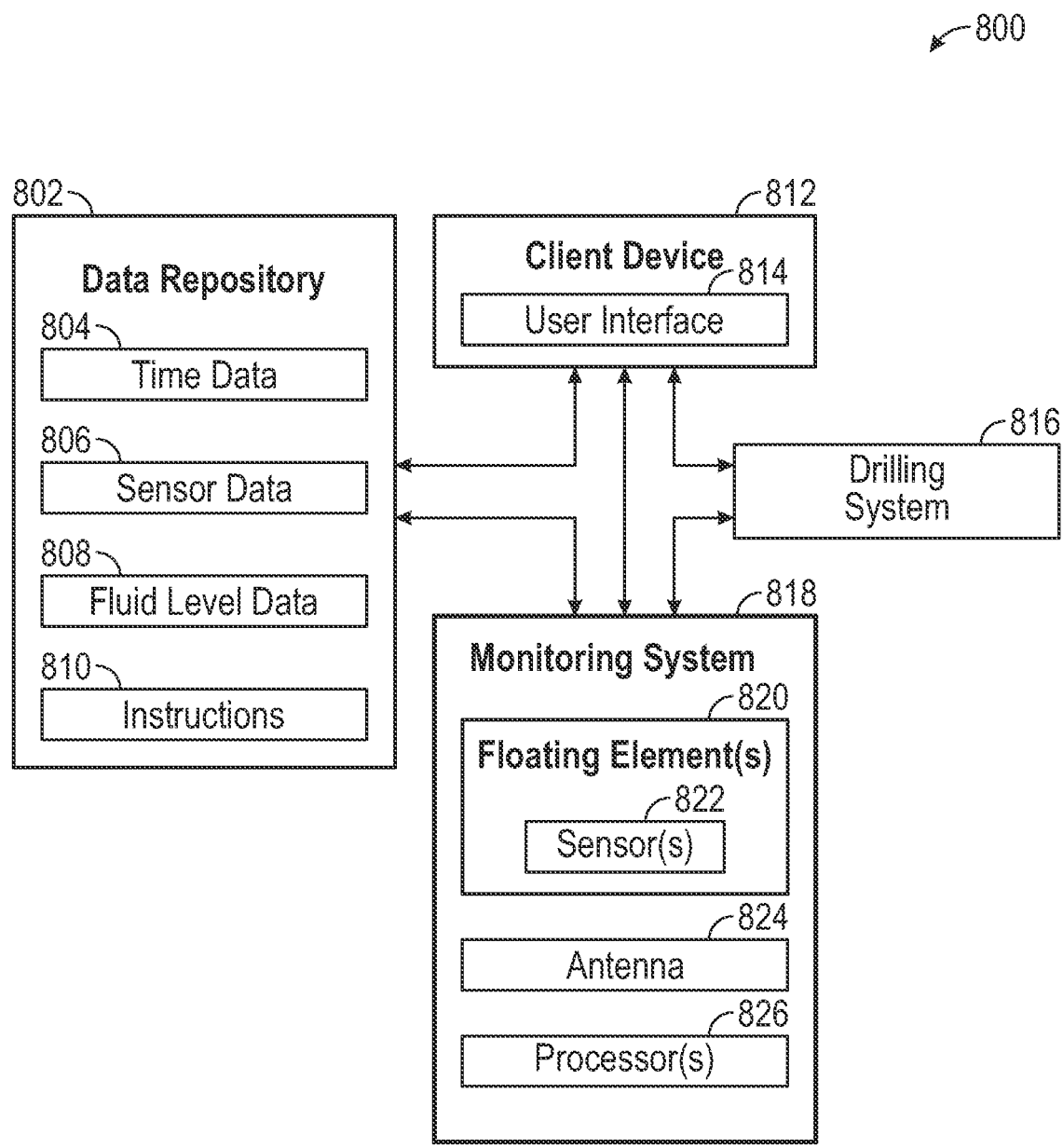
FIG. 8 is a block diagram that illustrates a system for monitoring the annular fluid level in the well, according to one or more example embodiments.

FIG. 8 is a block diagram that illustrates a system 800 for monitoring the annular fluid level in the well, according to one or more example embodiments. System 800 includes a monitoring system 818, a data repository 802, a client device 812, and a drilling system 816. The monitoring system 818 is shown as including one or more floating elements 820, an antenna 824, and one or more hardware processors 826. In some example embodiments, the floating element 820 includes one or more sensors 822 configured to detect the presence of a hydrocarbon (e.g., a gas) in the annulus. In some example embodiments, the data captured by the one or more sensors 822 is stored as sensor data 806 in the data repository 802.

In some example embodiments, the floating element 820 is disposed on a surface of a drilling fluid within an annulus of a well, during mud cap drilling operations. In some instances, the floating element 820 is a passive floater. In other instances, the floating element 820 is powered by mechanical energy harvested from the drillstring vibrations through flotation of the floating element 820.

The antenna 824 is disposed above the floating element 820 (e.g., within the annulus of the well). In some example embodiments, the antenna 824 is disposed below a rotary table of the well, above the floating element 820. In some instances, the antenna is attached to a rotary table of the well via an extension element that extends downward into the annulus of the well. The antenna 824 is configured to transmit a first signal to the floating element, and to receive a second signal from the floating element in response to the first signal.

In various example embodiments, the type of the antenna is selected based on a characteristic of the floating element.

For example, the dimensions of the floating element, determined based on the sizes of the drill pipe and casing, affect the type of antenna selected.

In some instances, the floating element 820 utilizes (e.g., is manufactured from or is coated with) a highly dielectrically visible material that improves the reliability of radar- or microwave-based communications between the antenna 824 and the floating element 820.

In various example embodiments, the type of the antenna is selected based on an estimated absolute level of the drilling fluid. For example, a change of the annular level up to fifty meters may be the basis for selecting a first type of floating element, while a change of the annular level of two thousand meters may be the basis for selecting a second type of floating element.

The antenna 824 is configured to transmit a first signal to the floating element 820 and receive a second signal from the floating element 820 in response to the first signal. The antenna 824 may record the time of transmittal of the first signal and the time of receipt of the second signal.

The processor 826 is configured to access (e.g., receive) the time of transmittal of the first signal and the time of receipt of the second signal from the antenna 824, and to determine a time value that measures the time between the transmittal, by the antenna, of the first signal and the receipt, by the antenna, of the second signal. In some example embodiments, the time value is stored as time data 804 in the data repository 802.

The processor 826 is further configured to determine a state of a drilling fluid level within the annulus based on the time value, and to update a drilling program for the well based on the state of the drilling fluid level. The drilling program may be executed on a computing device such as that shown in FIG. 11.

In various example embodiments, the processor 826 is further configured to determine the drilling fluid level within the annulus of the well based on a velocity of the first signal and the time value. In some example embodiments, the data pertaining to the state of the drilling fluid level within the annulus and to the drilling fluid level within the annulus is stored as fluid level data 806 in the data repository 802.

In certain example embodiments, the updating of the drilling program includes generating instructions to cause a change to the drilling operations based on the state of the drilling fluid level. The drilling system 816 may include a computing device, such as that shown in FIG. 11, that executes the generated instructions. The generated instructions may be stored as instructions 810 in the data repository 802.

In some example embodiments, the processor 826 is included in the antenna 824. In various example embodiments, the processor 826 is external to the antenna 824. For example, the processor 826 is included in a control system (e.g., control system 216 of FIG. 2) external to the well.

In certain example embodiments, the antenna 824 includes an acoustic transceiver and the floating element 820 includes an acoustic reflector. The first signal is an acoustic wave transmitted by the acoustic transceiver, and the second signal is a reference echo received, by the transceiver, from the acoustic reflector in response to the acoustic reflector reflecting the acoustic wave.

In some example embodiments, the antenna 824 includes an optical transceiver and the floating element includes an optical reflector. The first signal is an optical wave transmitted by the optical transceiver, and the second signal is a reflected optical wave received, by the transceiver, from the optical reflector in response to the optical reflector reflecting the optical wave.

According to some example embodiments, the floating element 820 includes a sensor 822 configured to detect a presence of a gas within the annulus of the well. The floating element 820 is configured to indicate, in the second signal, the presence of the gas within the annulus. The processor 826 is further configured to determine the drilling fluid level within the annulus of the well based on a velocity of the first signal, the time value, and a multiplier determined based on a type of the gas within the annulus.

The components of the monitoring system 818 are operatively connected and are configured to communicate with each other (e.g., via a bus, shared memory, a switch, wirelessly, etc.). In addition, the monitoring system 818 is configured to communicate with the data repository 802 to access and store data.

The monitoring system 818 is also configured to communicate with the client device 812 that includes the user interface 814. In some example embodiments, the client device 812 comprises a computing device that includes at least a display and communication capabilities to communicate with the monitoring system 818, the data repository 802, and the drilling system 816 via an electronic network. The client device 812 may comprise, but is not limited to, a computer, a work station, a desktop, a laptop, a tablet, a smart phone, a hand-held device, an Internet appliance, a wearable device, a smart phone, a cellular (or mobile) phone, a multi-processor system, a mini-computer, etc. The user interface 814 may be a graphical user interface (GUI) or a command line interface. The user interface 814 may display data retrieved, accessed, obtained, or received from the data repository 802, the monitoring system 818, and the drilling system 816 on a display device, such as a computer monitor or a touchscreen on the client device 812. Furthermore, the user interface 814 may present data to a user, for example, through text or rendered by the client device 812 into a visual representation of the data, such as through visualizing a data model.

In some example embodiments, the monitoring system 818 generates a communication that references the state of the drilling fluid level within the annulus or the drilling fluid level within the annulus and provides a recommendation of an action with respect to the state of the drilling fluid level or the drilling fluid level. The monitoring system 818 transmits the communication to the client device 812 and causes display of the communication in the user interface 814 of the client device 812. In some example embodiments, the user of the client device 812 accesses the monitoring system 818 via the user interface 814.

As shown in FIG. 8, the client device 812 is also configured to communicate with the data repository 802 to access and store data. In addition, the client device 812 is also configured to communicate with the drilling system 816.

Figure 9:
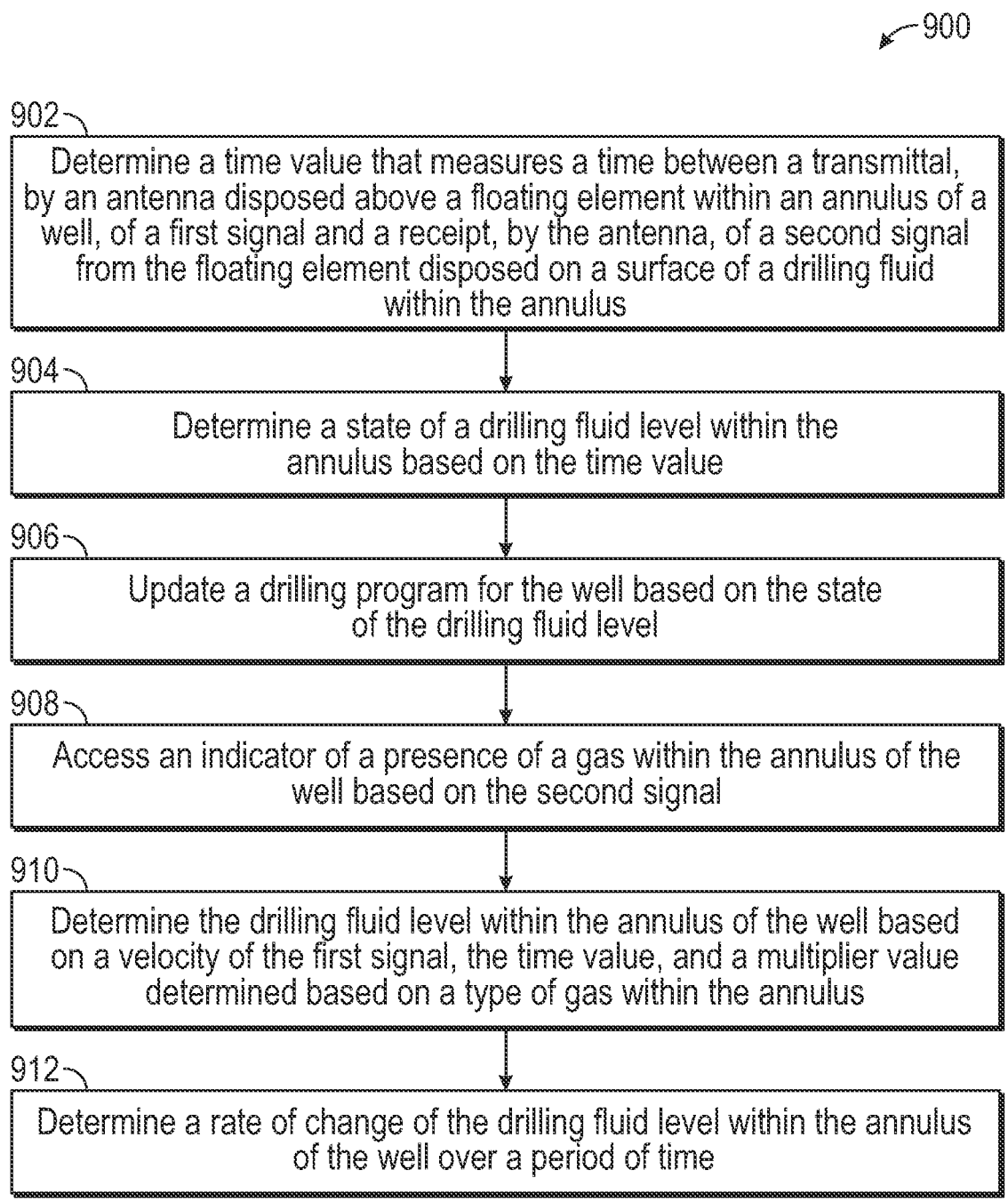
FIG. 9 is a flowchart illustrating operations of a monitoring system in performing a method for monitoring the annular fluid level in the well, according to one or more example embodiments.

FIG. 9 is a flowchart illustrating operations of a monitoring system in performing a method 900 for monitoring the annular fluid level in the well, according to one or more example embodiments. Steps of the method 900 may be performed using the components described above with respect to FIG. 8. One or more blocks in FIG. 9 may be performed by a computing system described below with respect to FIG. 11. While the various blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At Step 902, a processor 826 determines a time value that measures a time between a transmittal, by an antenna 824, of a first signal to a floating element 820 disposed on a surface of a drilling fluid within an annulus of a well, and a receipt, by the antenna 824, of a second signal from the floating element 820. In various example embodiments, the floating element 820 is disposed on the surface of the drilling fluid within the annulus during mud cap drilling operations. In some example embodiments, the antenna 824 is disposed above the floating element 820 (e.g., below a rotary table of the well). In various example embodiments, the antenna 824 is disposed within an annulus of a well, above the floating element 820. The antenna 824 is configured to transmit a first signal to the floating element, and to receive a second signal from the floating element in response to the first signal.

According to certain example embodiments, the antenna 824 includes an acoustic transceiver, and the floating element 820 includes an acoustic reflector. The first signal is an acoustic wave transmitted by the acoustic transceiver. The second signal is a reference echo received, by the transceiver, from the acoustic reflector in response to the acoustic reflector reflecting the acoustic wave.

According to some example embodiments, the antenna 824 includes an optical transceiver, and the floating element 820 includes an optical reflector. The first signal is an optical wave transmitted by the optical transceiver. The second signal is a reflected optical wave received, by the transceiver, from the optical reflector in response to the optical reflector reflecting the optical wave.

At Step 904, the processor 826 determines a state of a drilling fluid level within the annulus based on the time value. In various example embodiments, the processor 826 also determines the drilling fluid level within the annulus of the well based on a velocity of the first signal and the time value.

At Step 906, the processor 826 updates a drilling program for the well based on the state of the drilling fluid level. In some example embodiments, the updating of the drilling program includes generating an alert based on a determination of the state of the drilling fluid level within the annulus.

At Step 908, the processor 826 accesses an indicator of a presence of a gas within the annulus of the well based on the second signal.

At Step 910, the processor 826 determines the drilling fluid level within the annulus of the well based on a velocity of the first signal, the time value, and a multiplier value determined based on a type of the gas within the annulus.

At Step 912, the processor 826 determines a rate of change of the drilling fluid level within the annulus of the well over a period of time.

Figure 10:
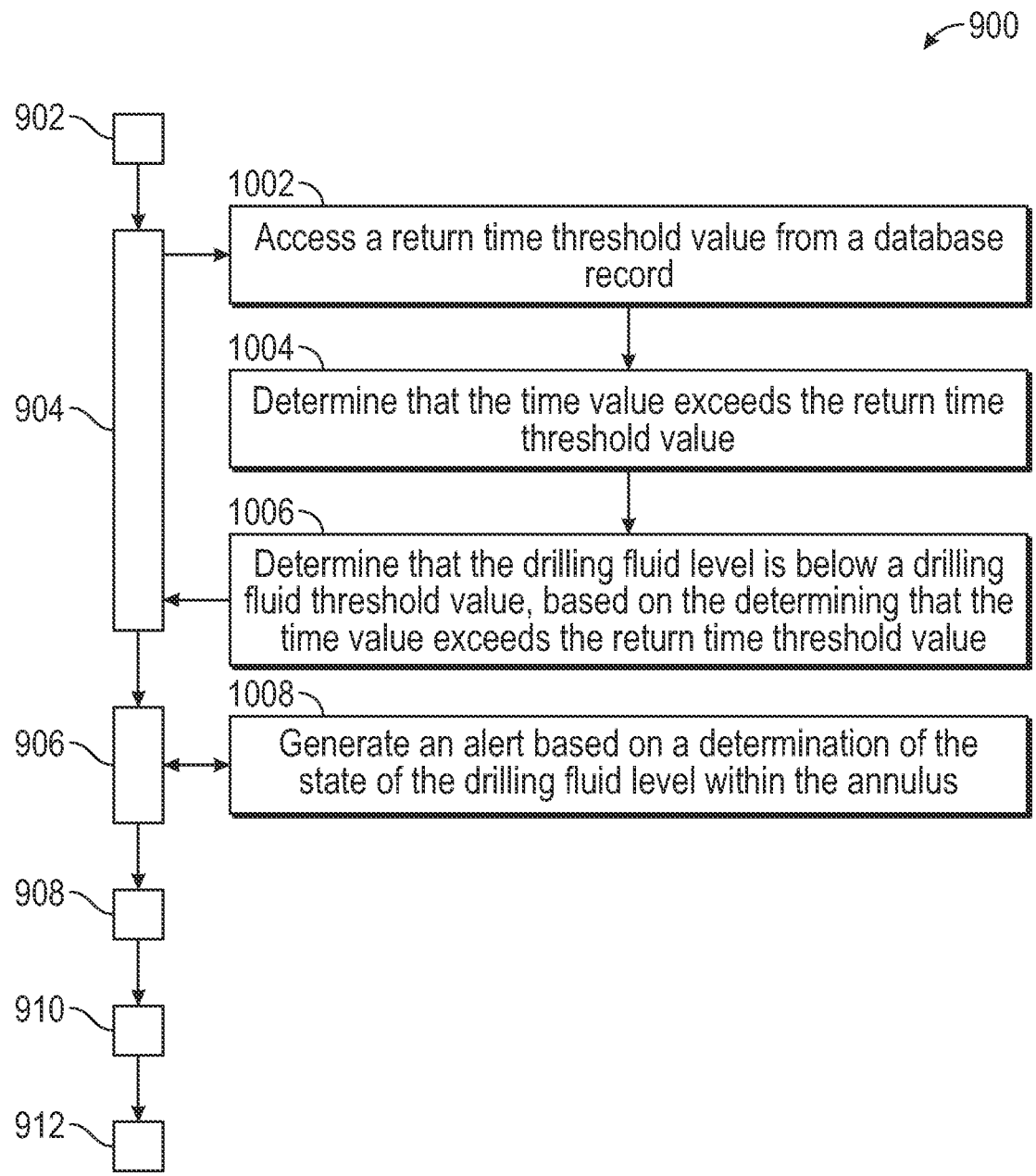
FIG. 10 is a flowchart illustrating operations of a monitoring system in performing a method for monitoring the annular fluid level in the well, according to one or more example embodiments.

As shown in FIG. 10, the method 900 may include one or more of Steps 1002, 1004, 1006, and 1008, according to some example embodiments. Step 1002 may be performed as part (e.g., a precursor task, a subroutine, or a portion) of Step 904, in which the processor 826 determines a state of a drilling fluid level within the annulus based on the time value.

At Step 1002, the processor 826 accessing a return time threshold value from a database record.

At Step 1004, the processor 826 determines that the time value exceeds the return time threshold value.

At Step 1006, the processor 826 determines that the drilling fluid level is below a drilling fluid threshold value, based on the determining that the time value exceeds the return time threshold value.

Step 1008 may be performed as part (e.g., a precursor task, a subroutine, or a portion) of Step 906, in which the processor 826 updates a drilling program for the well based on the state of the drilling fluid level. At Step 1008, the processor 826 generates an alert based on a determination of the state of the drilling fluid level within the annulus. The processor 826 may also transmit the alert to the client device 812.

Figure 11:
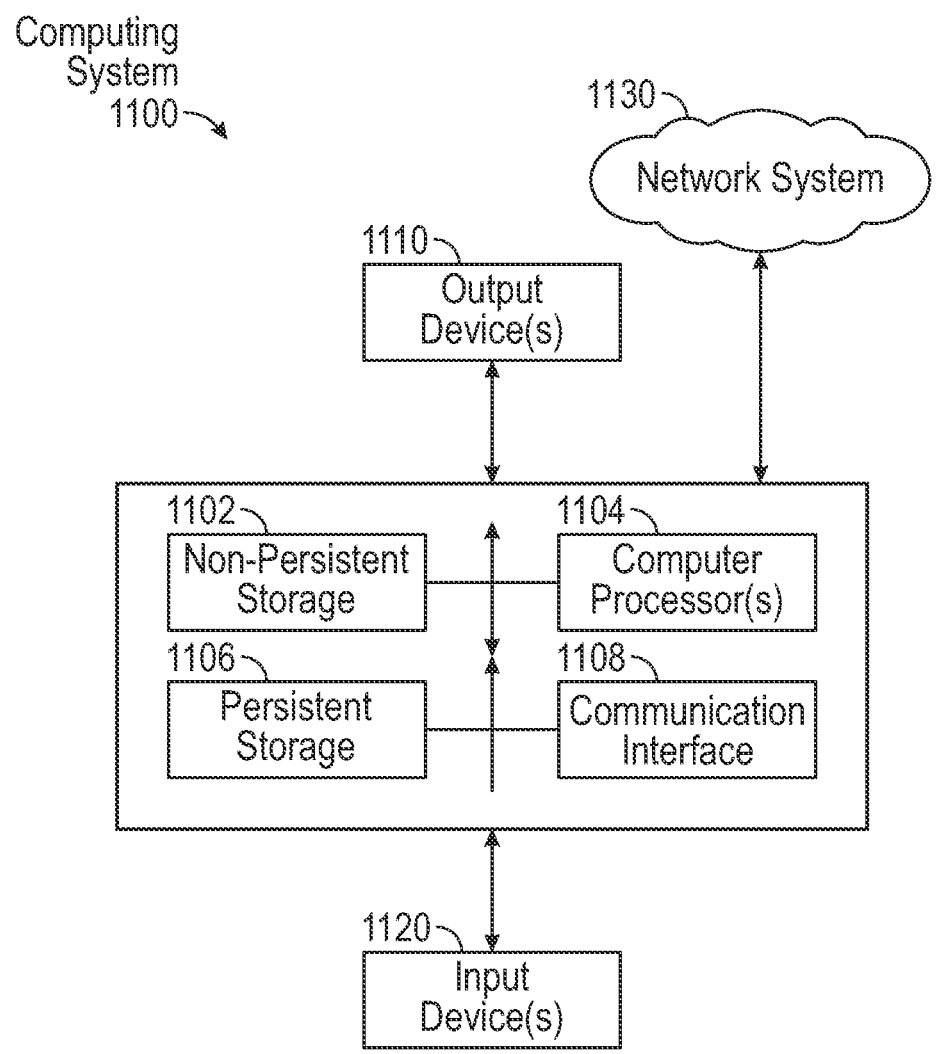
FIG. 11 illustrates a computing system, according to one or more example embodiments.

Turning to FIG. 11, FIG. 11 shows a computing system in accordance with one or more embodiments. As shown in FIG. 11, the computing system 1100 may include one or more computer processor(s) 1104, non-persistent storage 1102 (e.g., random access memory (RAM), cache memory, or flash memory), persistent storage 1106 (e.g., a hard disk), a communication interface 1108 (e.g., transmitters and/or receivers), as well as other elements. The computer processor(s) 1104 may be an integrated circuit for processing instructions. The computing system 1100 may also include one or more input device(s) 1120, such as a touchscreen, a keyboard, a mouse, a microphone, a touchpad, an electronic pen, or any other type of input device. In some embodiments, the one or more input device(s) 1120 may be a graphical user interface (GUI). Further, the computing system 1100 may include one or more output device(s) 1110, such as a screen (e.g., a liquid crystal display (LCD), a plasma display, or a touchscreen), a printer, external storage, or any other output device. One or more of the output device(s) 1110 may be the same or different from the input device(s) 1120. The computing system 1100 may be connected to a network system 1130 (e.g., a local area network (LAN), a wide area network (WAN) such as the Internet, a mobile network, or any other type of network) via a network interface connection.

In one or more embodiments, for example, the input device 1120 may be coupled to a receiver and a transmitter used for exchanging communications with one or more peripherals connected to the network system 1130. The transmitter may relay information received by the receiver to other elements of the computing system 1100. Further, the computer processor(s) 1104 may be configured for performing or aiding in implementing the processes described in reference to FIGS. 1-10.

Further, one or more elements of the computing system 1100 may be located at a remote location and may be connected to the other elements over the network system 1130. The network system 1130 may be a cloud-based interface that performs processing at a remote location, away from the well site, and that is connected to the other elements over a network. In this case, the computing system 1100 may be connected through a remote connection established using a 5G connection, such as protocols established in Release 15 and subsequent releases of the 3GPP/New Radio (NR) standards.

The computing system of FIG. 11 may include or may be connected to a data repository. The data repository may be a database. A database is a collection of information configured for ease of data retrieval, modification, re-organization, and deletion. In some embodiments, the database includes measured data relating to the methods, the systems, and the devices as described in reference to FIGS. 1-10.

While FIGS. 1-11 show various configurations of components, other configurations may be used without departing from the scope of the disclosure. For example, various components may be combined to create a single component. As another example, the functionality performed by a single component may be performed by two or more components.

Although only a few example embodiments have been described in detail above, those skilled in the art will readily appreciate that many modifications are possible in the example embodiments without materially departing from this description. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112(f) for any limitations of any of the claims herein, except for those in which the claim expressly uses the words "means for" together with an associated function.

What is claimed:

1. A system comprising:
   a floating element disposed on a surface of a drilling fluid within an annulus of a well, during mud cap drilling operations;
   an antenna disposed above the floating element, the antenna being configured to:
      transmit a first signal to the floating element, and
      receive a second signal from the floating element in response to the first signal; and
   a processor configured to:
      determine a time value that measures a time between a transmittal, by the antenna, of the first signal and a receipt, by the antenna, of the second signal,
      determine a state of a drilling fluid level within the annulus via:
         accessing a return time threshold value from a database record;
         determining that the time value exceeds the return time threshold value; and
         determining that the drilling fluid level is below a drilling fluid threshold value, based on the determining that the time value exceeds the return time threshold value;
      update a drilling program for the well based on the state of the drilling fluid level.

2. The system of claim 1, wherein the antenna is disposed below a rotary table of the well.

3. The system of claim 1, wherein the processor is included in a control system external to the well.

4. The system of claim 1, wherein the antenna includes an acoustic transceiver,
   wherein the floating element includes an acoustic reflector,
   wherein the first signal is an acoustic wave transmitted by the acoustic transceiver, and
   wherein the second signal is a reference echo received, by the transceiver, from the acoustic reflector in response to the acoustic reflector reflecting the acoustic wave.

5. The system of claim 1, wherein the antenna includes an optical transceiver,
   wherein the floating element includes an optical reflector,
   wherein the first signal is an optical wave transmitted by the optical transceiver, and
   wherein the second signal is a reflected optical wave received, by the transceiver, from the optical reflector in response to the optical reflector reflecting the optical wave.

6. The system of claim 1, wherein a type of the antenna is selected based on a characteristic of the floating element.

7. The system of claim 1, wherein a type of the antenna is selected based on an estimated absolute level of the drilling fluid.

8. The system of claim 1, wherein the updating of the drilling program includes:
   generating an alert based on a determination of the state of the drilling fluid level within the annulus.

9. The system of claim 1, wherein the processor is further configured to determine the drilling fluid level within the annulus of the well based on a velocity of the first signal and the time value.

10. The system of claim 1, wherein the floating element includes a sensor configured to detect a presence of a gas within the annulus of the well,
    wherein the floating element is configured to indicate, in the second signal, the presence of the gas within the annulus, and
    wherein the processor is further configured to determine the drilling fluid level within the annulus of the well based on a velocity of the first signal, the time value, and a multiplier determined based on a type of the gas within the annulus.

11. The system of claim 1, wherein the processor is further configured to determine a rate of change of the drilling fluid level within the annulus of the well over a period of time.

12. The system of claim 1, wherein the floating element is powered by mechanical energy harvested through flotation of the floating element.

13. The system of claim 1, wherein the antenna is attached to a rotary table of the well via an extension element that extends downward into the annulus of the well.

14. A method comprising:
    determine a time value that measures a time between a transmittal, by an antenna disposed above a floating element within an annulus of a well, of a first signal and a receipt, by the antenna, of a second signal from the floating element disposed on a surface of a drilling fluid within the annulus;
    determining a state of a drilling fluid level within the annulus via:
       accessing a return time threshold value from a database record;
       determining that the time value exceeds the return time threshold value; and
       determine that the drilling fluid level is below a drilling fluid threshold value, based on the determining that the time value exceeds the return time threshold value, and
    updating a drilling program for the well based on the state of the drilling fluid level.

15. The method of claim 14, wherein the updating of the drilling program includes:
    generating an alert based on a determination of the state of the drilling fluid level within the annulus.

16. The method of claim 14, further comprising:
    determining the drilling fluid level within the annulus of the well based on a velocity of the first signal and the time value.

17. The method of claim 14, further comprising:
    accessing an indicator of a presence of a gas within the annulus of the well based on the second signal;
    determining the drilling fluid level within the annulus of the well based on a velocity of the first signal, the time value, and a multiplier value determined based on a type of the gas within the annulus.

18. The method of claim 14, further comprising:
determining a rate of change of the drilling fluid level within the annulus of the well over a period of time.

19. A system comprising:
a floating element disposed on a surface of a drilling fluid within an annulus of a well, during mud cap drilling operations;
an antenna disposed above the floating element and attached to a rotary table of the well via an extension element that extends downward into the annulus of the well, the antenna being configured to:
  transmit a first signal to the floating element, and
  receive a second signal from the floating element in response to the first signal; and
a processor configured to:
  determine a time value that measures a time between a transmittal, by the antenna, of the first signal and a receipt, by the antenna, of the second signal,
  determine a state of a drilling fluid level within the annulus based on the time value, update a drilling program for the well based on the state of the drilling fluid level.

\* \* \* \* \*